United States Patent
Das

(10) Patent No.: US 9,879,667 B2
(45) Date of Patent: Jan. 30, 2018

(54) VARIABLE LOAD SENSE SPRING SETTING FOR AXIAL PISTON OPEN CIRCUIT PUMP

(71) Applicant: DANFOSS POWER SOLUTIONS INC., Ames, IA (US)

(72) Inventor: Abhijit Das, Ames, IA (US)

(73) Assignee: Danfoss Power Solutions Inc., Ames, IA (US)

(*) Notice: Subject to any disclaimer, the term of this patent is extended or adjusted under 35 U.S.C. 154(b) by 457 days.

(21) Appl. No.: 14/633,653

(22) Filed: Feb. 27, 2015

(65) Prior Publication Data

US 2015/0247496 A1  Sep. 3, 2015

Related U.S. Application Data

(60) Provisional application No. 61/947,038, filed on Mar. 3, 2014.

(51) Int. Cl.
| | | |
|---|---|---|
| G06F 17/11 | (2006.01) | |
| F04B 49/06 | (2006.01) | |
| F04B 1/26 | (2006.01) | |

(52) U.S. Cl.
CPC .............. *F04B 49/065* (2013.01); *F04B 1/26* (2013.01); *G06F 17/11* (2013.01)

(58) Field of Classification Search
USPC ........................................................ 700/282
See application file for complete search history.

(56) References Cited

U.S. PATENT DOCUMENTS

| | | | |
|---|---|---|---|
| 4,152,896 | A | 5/1979 | Tohma et al. |
| 5,876,185 | A | 3/1999 | Schimpf et al. |
| 7,191,589 | B2 | 3/2007 | Yasui et al. |
| 2008/0215191 | A1 | 9/2008 | Sundqvist |

FOREIGN PATENT DOCUMENTS

| | | |
|---|---|---|
| CA | 1281259 | 3/1991 |
| CA | 1281259 C | 3/1991 |
| CN | 101189433 A | 5/2008 |
| CN | 101608648 A | 12/2009 |
| CN | 101784799 A | 7/2010 |
| CN | 202382943 U | 8/2012 |
| CN | 103233946 A | 8/2013 |
| CN | 203130655 U | 8/2013 |
| DE | 102009058406 A1 | 6/2011 |
| WO | 200192974 A2 | 12/2001 |

(Continued)

OTHER PUBLICATIONS

Lin et al., Nonlinear Design of Active Suspension, 1997, IEEE Journals & Magazines, vol. 17, Issue 3, pp. 45-59.*

(Continued)

*Primary Examiner* — Cindy H Khuu
(74) *Attorney, Agent, or Firm* — Zarley Law Firm, P.L.C.

(57) ABSTRACT

A variable load sense spring setting for an axial piston open circuit having three subsystems. A backstepping control applied to the first and second subsystems to determine an operator control input and a load sense spool effective open area control input that stabilize the first and second subsystems. The calculating a feasible load sense area from the third subsystem and the control inputs.

8 Claims, 11 Drawing Sheets

(56) References Cited

FOREIGN PATENT DOCUMENTS

WO     WO200192974 A2    12/2001
WO       2006/128516 A1    12/2006

OTHER PUBLICATIONS

CN101189433A_English Abstract.
CN202382943U_English Abstract.
CN101608648A_English Abstract.
CN101784799A_English Abstract.
CN203130655U_English Abstract.
Chinese Office Action issued by the State Intellectual Property Office (SIPO) dated Aug. 2, 2016; Chinese Patent Application No. 201510095610.9; Danfoss Power Solutions. English translation.
DE102009058406_English translation.
CN103233946_English translation.

* cited by examiner

VARIABLE LOAD SENSE SPRING SETTING FOR AXIAL PISTON OPEN CIRCUIT PUMP

CROSS REFERENCE TO RELATED APPLICATION

This application claims the benefit of U.S. Provisional Application No. 61/947,038 filed Mar. 3, 2014.

BACKGROUND OF THE INVENTION

This invention is directed to a hydraulic load sense system, and more particularly to a hydraulic load sense system for nonlinear applications.

Load sense systems are used widely throughout the power hydraulic industries. One of the main reasons of its popularity is the simplicity of control. Using Load Sense and Pressure Control appropriately, a load sense system is typically passive in nature which can be seen easily analytically. The difference between analytically found solutions and practical implementations lies in the choice of appropriate parameters such as clearance, spool area profile etc. Some of these parameters prescribe overall stability of the pump and in most cases these are figured out by several trial and error methods.

A complete hydraulic load sense system such as that found in an excavator is a naturally complex model. Components such as the engine, hydraulic pump, valves, uncertain load dynamics as well as uncertain operator behavior can instigate instability in various ways in a complex load-sense system. Many have confronted this situation in different ways. Most have ignored some practical aspects such as effect of load-sense control spool area etc. For a typical load sense system if the engine speed is assumed to be constant, the operator input to the valve is the only external input or effect into the system that drives the stability of the whole system. The variation in the load could be considered as external disturbance. Even though it is possible to formulate a control algorithm with one input for the whole system, the analytical solution would be very difficult to obtain because of the complexity of the involved nonlinear dynamics. Linearized models are good enough for predicted load situations, however the controls derived based on a linearized model may not be effective as nonlinear control under uncertain load conditions. Therefore, there exists a need in the art for a manner in which to address these deficiencies.

Therefore, an objective of the present invention is to prove a hydraulic load sense control that is based upon a nonlinearized model.

Another objective of the present invention is to provide a hydraulic load control actuated by operator command and load-sense spool effective opening area.

These and other objectives will be apparent to one of ordinary skill in the art based upon the following written description, drawings, and claims.

BRIEF SUMMARY OF THE INVENTION

A hydraulic load sense system for nonlinear applications having a first subsystem related to operator command, a second load system related to a load sense spool effective opening area, and third subsystem related to a load sense spool displacement. A first control input to stabilize the first subsystem and a second control input to stabilize the second subsystem are determined by a computer by applying backstepping controls to the first and second subsystems. Using the first and second controls and the third subsystem a feasible load sense area is calculated by the computer. The computer then uses the feasible load sense area to control a hydraulic pump.

DETAILED DESCRIPTION OF THE PREFERRED EMBODIMENT

Figure 1:
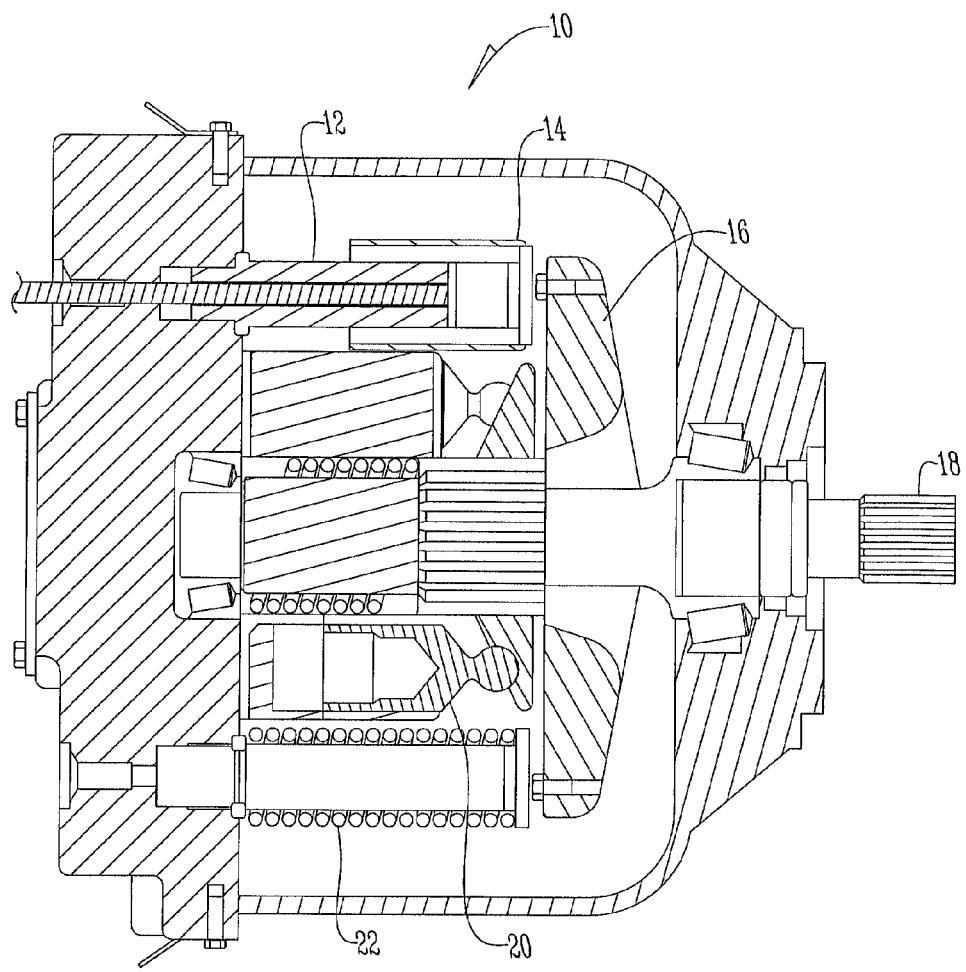
FIG. 1 is a side sectional view of a load sense pump.

Referring to FIG. 1, shown is a sectional view of a load sense pump 10. Included in the pump 10 is a servo piston 12 that is slidably received within a servo piston guide 14. The guide 14 engages a swashplate 16 that is operatively connected to a rotor shaft 18. Opposite the servo piston 12, and also engaging the swashplate 16 is a bias piston 20 having a bias spring 22.

Figure 2:
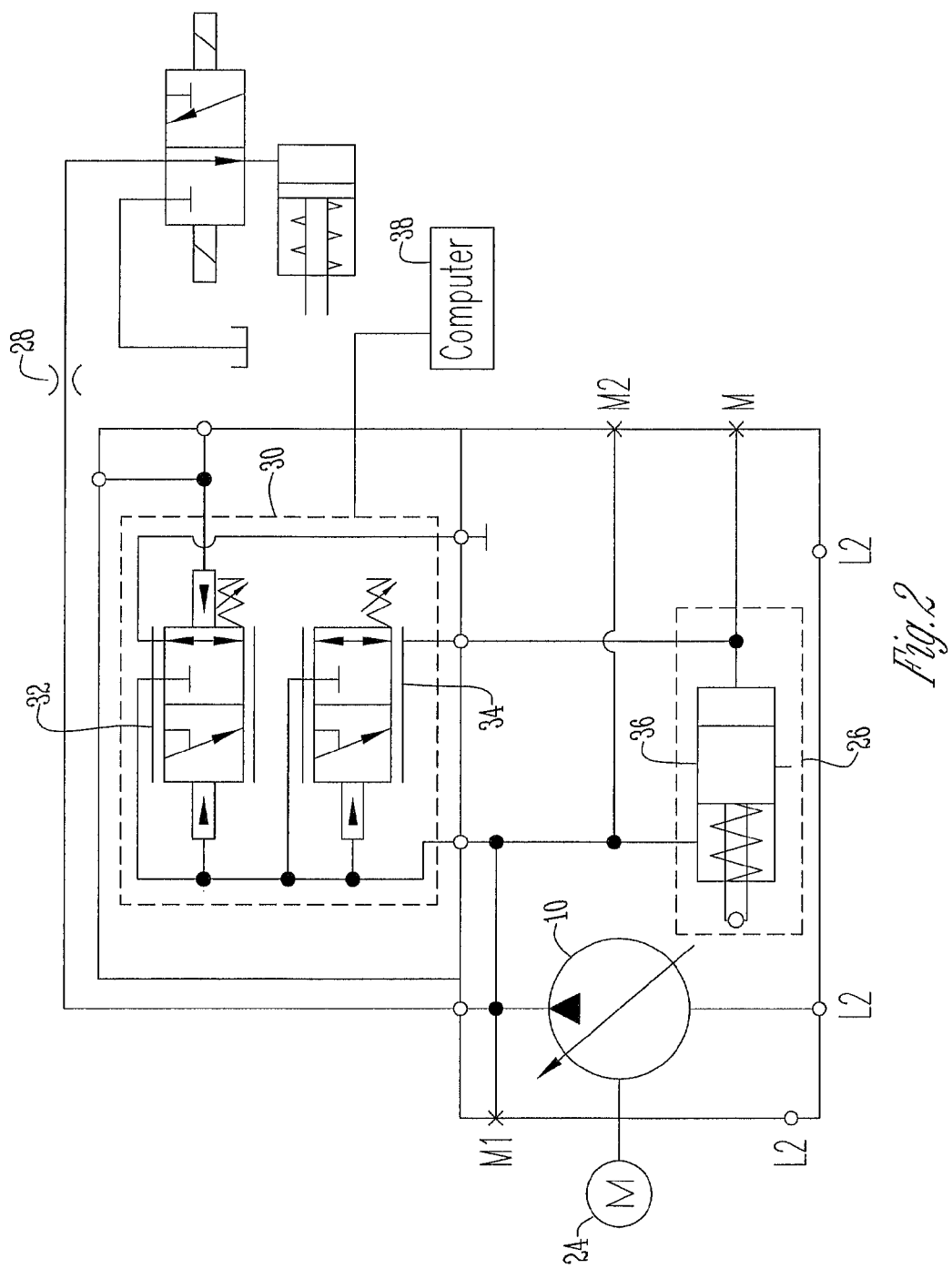
FIG. 2 is a schematic view of a load sense system.

FIG. 2 shows a schematic view of a hydraulic load sense system. A motor 24 is connected to pump 10. Pump 10 delivers and pressurizes fluid from a tank 26 to a control valve 28 at system pressure. As an example, valve 28 is a variable area orifice controlled by operator input. A compensation circuit 30 is provided that includes a pressure limiting compensation valve 32 and a load sense compensation valve 34. The system also includes a torque control valve 36 such as a servo piston that adjusts the displacement of the swashplate 16. Connected to the system is a personal computer 38. Alternatively a load sense control can be used.

The nonlinear model of the hydraulic system is described with the following differential equations. The load sense spool dynamic is given by $$\ddot{x}_{ls} = \frac{1}{m_{ls}} \{c_{ls}\dot{x}_{ls} - K_{ls}x_{ls} + A_{ls}(P_s - P_{ls} - P_{k_{ls}})\} \quad (1)$$

where $P_{k_{ls}}$=load sense spring force per unit area which also known as margin pressure. The Pressure Control spool dynamics is given by $$\ddot{x}_{pc} = \frac{1}{m_{pc}} \{-C_{pc}\dot{x}_{pc} - K_{pc}x_{pc} + A_{pc}(P_s - P_{k_{pc}})\} \quad (2)$$

where $P_{k_{pc}}$ is the Pressure Control spring setting as force per unit area and we will design it later in this paper. The swash plate kit dynamics is given by Equation (3).

$$I_a\ddot{a} = -C_a\dot{a} - K_a a + T_{mswash} + l_{bs}P_{bs}A_{bs} + l_{bs}K_{bs}x_{bs} - l_{sv}P_{sv}A_{sv} \quad (3)$$

$T_{mswash}$ is the swash moments generated by pump piston movements. We used tabulated test data to interpret this dynamics into simulations. Servo flow in and out of servo is defined as [8]

$$Q_{stsv} = C_d A_{stsv} \sqrt{2/\rho(P_s - P_{sv})}$$

$$Q_{svtt} = C_d A_{svtt} \sqrt{2/\rho(P_{sv} - P_1)} \quad (4)$$

Figure 3:
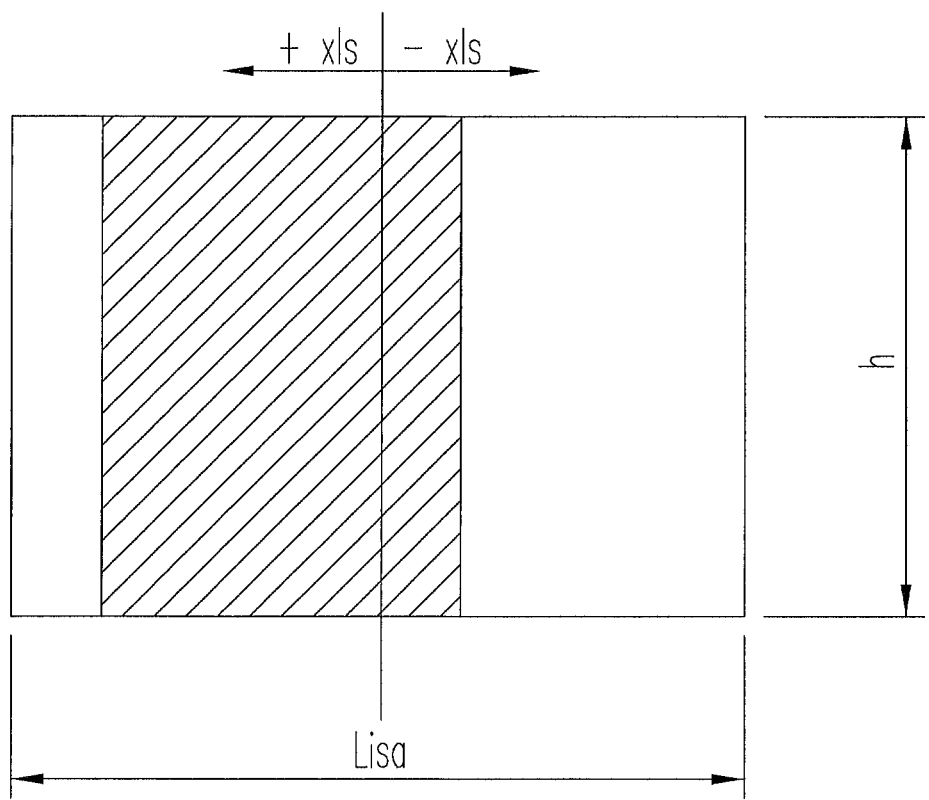
FIG. 3 is a graph showing a Load Sense spool variable area slot.

FIG. 3 shows a graph of the variable area slot. For positive $x_{ls}$ the servo flow is defined as flow from source to servo. On the other hand, for negative $x_{ls}$ the flow is defined as servo to tank. The total horizontal length of the rectangular area is defined as $L_{lsA}$ and the vertical length is defined as h.

$$\text{Maximum opening area} = \frac{L_{lsA}}{2} h \quad (15)$$

and for a given Load Sense spool displacement the area is defined as $x_{ls}h$ for flow from source to servo and $$\left(\frac{L_{lsA}}{2} - x_{ls}\right)$$

h as flow from servo to tank. This permits one to calculate a feasible Load Sense spool area through Lyapunov stability analysis such that it would help to calculate the size of choke and gain orifices with required. This is the motive of using Load Sense spool area as an external input. Now the servo pressure is defined by the following differential equation as $$\dot{P}_{sv} = \frac{\beta}{V_{sv}} \left( c_d A_{stsv} \sqrt{\frac{2}{\rho}(P_s - P_{sv})} - c_d A_{svtt} \sqrt{\frac{2}{\rho}(P_{sv} - P_1)} \right) \quad (5)$$

or $$\dot{P}_{sv} = \frac{\beta}{V_{sv}} \left[ c_d x_{ls} h \sqrt{\frac{2}{\rho}(P_s - P_{sv})} - c_d h \left(\frac{L_{lsA}}{2} - x_{ls}\right) \sqrt{\frac{2}{\rho}(P_{sv} - P_1)} \right] \quad (6)$$

Note that both the servo and bias piston slide across the swash plate for nonzero swash angle a and therefore the effective length from the swash plate kit center to servo and bias piston contact points are described as $$x_{sv} = -l_{sv} \tan a$$

$$x_{bs} = l_{bs} \tan a \quad (7)$$

Source flow $Q_s$, flow from source to load $Q_{stld}$ and flow from actuator to tank $Q_{ldtt}$ is defined respectively as $$Q_s = \frac{n_p A_p l_p \tan a}{\pi} \omega - Q_{stsv} \quad (8)$$

$$Q_{stld} = C_d A_{stld} \sqrt{\frac{2}{\rho}(P_s - P_{ld})}$$

$$Q_{ldtt} = C_d A_{ldtt} \sqrt{\frac{2}{\rho}(P_{ld} - P_t)}$$

Subsequently load pressure is defined as $$\dot{P}_{ld} = \frac{\beta}{V_{ld}} (Q_{stld} - A_{ld}\dot{x}_{ld}) \quad (9)$$

The hydraulic actuator load dynamics is defined as $$\ddot{x}_{ld} = -C_{ld}\dot{x}_{ld} - K_{ld}x_{ld} + A_{ld}P_{ld} - m_{ld}g - 0.7A_{ld}P_t \quad (10)$$

Since the cylinder ratio s 7:10 and the rod end of the actuator is directly connected to tank, it maintains the tank pressure of $P_t$.

$$\dot{P}_s = \frac{\beta}{V_{P_s}}(Q_s - Q_{stld} - Q_{leak}) \quad (11)$$

Now defining the states as $$x_1 = x_{pc}, \; x_2 = \dot{x}_{pc}, \; x_3 = P_s$$

$$x_4 = a, \; x_5 = \dot{a}, \; x_6 = P_{sv}$$

$$x_7 = x_{ls}, \; x_8 = \dot{x}_{ls}, \; x_9 = P_{ld}$$

$$x_{10} = x_{ld}, \; x_{11} = \dot{x}_{ld} \quad (12)$$

Rearranging the Equations from (1) to (11) and implying the state variables one can rewrite the following $$\dot{x}_1 = x_2 \quad (13)$$

$$\dot{x}_2 = \frac{1}{m_{pc}}\{-C_{pc}x_2 - K_{pc}x_1 - A_{pc}P_{k_{pc}}\} + \frac{A_{pc}}{m_{pc}}x_3 \quad (14)$$

$$\dot{x}_3 = \frac{\beta}{V_{P_s}}\left(-C_d A_{stld}\sqrt{\frac{2}{\rho}(x_3 - x_9)} - Q_{leak}\right) + \frac{\beta}{V_{P_s}}\frac{n_p A_p l_p}{\pi}\omega\tan(x_4) \quad (15)$$

$$\dot{x}_4 = x_5 \quad (16)$$

$$\dot{x}_5 = \quad (17)$$
$$\frac{1}{l_a}\{-C_a x_5 - K_a x_4 + T_{mswash} + l_{bs}A_{bs}x_3 + l_{bs}^2 K_{bs}\tan(x_4)\} - \frac{l_{sv}A_{sv}}{l_a}x_6$$

$$\dot{x}_6 = \frac{\beta}{V_{sv}}\left\{c_d x_7 h\sqrt{\frac{2}{\rho}(x_3 - x_6)} - c_d\left(\frac{L_{lsA}}{2} - x_7\right)h\sqrt{\frac{2}{\rho}(x_6 - P_t)}\right\} \quad (18)$$

$$\dot{x}_7 = x_8 \quad (19)$$

$$\dot{x}_8 = \frac{1}{m_{ls}}\{-C_{ls}x_8 - K_{ls}x_7 + A_{ls}(x_3 - x_9 - P_{k_{ls}})\} \quad (20)$$

$$\dot{x}_9 = \frac{\beta}{V_{ld}}\left\{C_d A_{stld}\sqrt{\frac{2}{\rho}(x_3 - x_9)} - A_{ld}x_{11}\right\} \quad (21)$$

$$\dot{x}_{10} = x_{11} \quad (22)$$

$$\dot{x}_{11} = -C_{ld}x_{11} - K_{ld}x_{10} - A_{ld}x_9 + 0.7A_{ld}P_t + m_{ld}g \quad (23)$$

Also considering the virtual state variable as $\delta_{39} = x_3 - x_9$ and thus $$\dot{\delta}_{39} = \frac{\beta}{V_{P_s}}\left(-C_d A_{stld}\sqrt{\frac{2}{\rho}\delta_{39}} - Q_{leak}\right) + \frac{\beta}{V_{P_s}}\frac{n_p A_p l_p}{\pi}\omega\tan(x_4) - \frac{\beta}{V_{ld}}\left\{C_d A_{stld}\sqrt{\frac{2}{\rho}\delta_{39}} - A_{ld}x_{11}\right\} \quad (24)$$

and assuming $V_{ps} \approx V_{ld}$ $$\dot{\delta}_{39} = \frac{\beta}{V_{P_s}}\frac{n_p A_p l_p}{\pi}\omega\tan(x_4) + \quad (25)$$

$$\frac{\beta}{V_{P_s}}A_{ld}x_{11} - \frac{\beta}{V_{P_s}}Q_{leak} - \frac{2\beta}{V_{P_s}}C_d A_{stld}\sqrt{\frac{2}{\rho}\delta_{39}}$$

This is based on the assumption that the volumes $V_{ps}$, $V_{ld}$ are the same without any loss of generality.

From these equations subsystems are defined. As an example, a first subsystem includes equations (21), (22), and (23), a second subsystem includes equations (15), (16), and (17), and a third subsystem includes equations (13), (14), (19) and (20). The first and the second systems are actuated by operator commands and load-sense spool effective opening. The third subsystem includes Pressure Control and Load Sense spools and is a passive system.

To determine an operator input that would stabilize the first subsystem a backstepping control is applied.

In control theory backstepping is used for designing stabilizing controls for a special recursive class of nonlinear systems. Starting with Equation (22) one figures out an appropriate $x_{11}$ so that Equation (22) will be stabilized. Now, Equation (22) can be written as $$\dot{x}_{10} = \theta_{11}(t) \tag{26}$$

$\theta_{11}(t)$ is known as the desired control law for subsystem (13) and the change of variable is $z_{11}=x_{11}-\theta_{11}(t)$. Then consider a Lyapunov function candidate $V_1$ as $$V_1 = \frac{1}{2}z_{11}^2 \geq 0 \tag{27}$$

Differentiating (27) and as $\delta_{39}=(x_3-x_9)$ one has $$\dot{V}_1 = z_{11}\dot{z}_{11} \tag{28}$$

$$\dot{V}_1 = z_{11}(\dot{x}_{11} - \dot{\theta}_{11}(t))$$

$$\dot{V}_1 = z_{11}\{-C_{ld}x_{11} - K_{ld}x_{10} +$$

$$A_{ld}(x_3 - x_9) + 0.7A_{ld}P_t - A_{ld}x_3 + m_{ld}g - \dot{\theta}_{11}(t)\}$$

$$\dot{V}_1 = z_{11}\{-C_{ld}x_{11} - K_{ld}x_{10} + A_{ld}\delta_{39} + 0.7A_{ld}P_t -$$

$$A_{ld}x_3 + m_{ld}g - \dot{\theta}_{11}(t)\}$$

Choosing a desired control law $\delta_{39}^d$ as $$\delta_{39}^d = A_{ld}^{-1}(C_{ld}x_{11} + K_{ld}x_{10} - 0.7A_{ld}P_t + A_{ld}x_3 - m_{ld}g - \gamma_{11}z_{11} + \dot{\theta}_{11}(t)) \tag{29}$$

If $\delta_{39}=\delta_{39}^d$ then $$\dot{V}_1 = -\gamma_{11}z_{11}^2 \leq 0, \gamma_{11} > 0 \tag{30}$$

Note that $z_{11}$ is the error variable for cylinder velocity $x_{11}$ with the desired cylinder velocity $x_{11}^d$; and therefore negative definiteness of (30) will guarantee the tracking. Also note that this process develops a tracking problem around cylinder velocity so that for any operator command the load velocity could be decided based on guided trajectory. This behavior will also solve the problem of cavitation for runaway loads.

However at this point one cannot guarantee $\delta_{39}=\delta_{39}^d$. Therefore another error variable is considered as $z_{39}=\delta_{39}-\delta_{39}^d$ and $\delta_{39}=z_{39}+\delta_{39}^d$ is substituted in the Equation (28); to $$\dot{V}_1 = z_{11}(-C_{ld}x_{11} - K_{ld}x_{10} + A_{ld}\{z_{39}+\delta_{39}^d\} + 0.7A_{ld}P_t - A_{ld}x_3 + m_{ld}g - \dot{\theta}_{11}(t)) = -\gamma_{11}z_{11}^2 + A_{ld}z_{11}z_{39} \tag{31}$$

Now, for differentiating error variable $z_{39}$; one gets $$\dot{z}_{39} = \dot{\delta}_{39} - \dot{\delta}_{39}^d = \frac{\beta}{V_{P_s}}\frac{n_p A_p l_p}{\pi}\omega\tan(x_4) + \tag{32}$$

$$\frac{\beta}{V_{P_s}}A_{ld}x_{11} - \frac{\beta}{V_{P_s}}Q_{leak} - \frac{2\beta}{V_{P_s}}C_d A_{stld}\sqrt{\frac{2}{\rho}\delta_{39}} - \dot{\delta}_{39}^d$$

At this stage a second Lyapunov function is considered as $V_2$ $$V_2 = V_1 + \frac{1}{2}z_{39}^2 \tag{33}$$

and differentiating (33) one has $$\dot{V}_2 = \dot{V}_1 + z_{39}\dot{z}_{39} = \tag{34}$$

$$-\gamma_{11}z_{11}^2 + A_{ld}z_{11}z_{39} + z_{39}\left\{\frac{\beta}{V_{P_s}}\frac{n_p A_p l_p}{\pi}\omega\tan(x_4) + \frac{\beta}{V_{P_s}}A_{ld}x_{11} - \frac{\beta}{V_{P_s}}Q_{leak} - \frac{2\beta}{V_{P_s}}C_d A_{stld}\sqrt{\frac{2}{\rho}\delta_{39}} - \dot{\delta}_{39}^d\right\}$$

Note that the proposed input as operator command to the valve has appeared in (34). For simplicity a simple variable area orifice as the valve is considered. Therefore operator command is assumed to directly proportional to the variable area of the orifice $A_{stld}$. Since the term $A_{stld}$ appeared in (34), an appropriate input is $A_{stld}$ such that $\dot{V}_2 \leq 0$. One of the possible choices for $A_{stld}$ could be $$A_{stld} = \left(\frac{2\beta}{V_{P_s}}C_d\sqrt{\frac{2}{\rho}\delta_{39}}\right)^{-1}\left\{A_{ld}(z_{11}+z_{39}) - \tag{35}\right.$$

$$\left.\frac{\beta}{V_{P_s}}Q_{leak} - \dot{\delta}_{39}^d + \frac{\beta}{V_{P_s}}\frac{n_p A_p l_p}{\pi}\omega\tan(x_4) + \frac{\beta}{V_{P_s}}A_{ld}x_{11}\right\}$$

so that $$\dot{V}_2 = -\gamma_{11}z_{11}^2 - A_{ld}\gamma_{39}z_{39}^2 \leq 0 \tag{36}$$

Equation (36) guarantees the negative semi-definiteness of $\dot{V}_2$, if (35) is feasible and implementable. Note that $A_{stld}$ in (35) is a function of the desired cylinder acceleration. Also, in the first subsystem, system pressure, servo pressure and load dynamics are involved and a desired valve area is derived in (35) to stabilize the first subsystem.

As $\delta_{39}^d$, has been designed, one now can replace $P_{k_{pc}}$ with $\delta_{39}^d$. Thus the system will have a variable load sense or margin pressure setting which could be realized by using electronic control of Load Sense spool spring setting. A variable margin also helps to reduce the loss across the valve.

To determine a second input control as effective load-sense spool area, a backstepping technique is applied to the second subsystem. The second subsystem involves swash-plate 16 and servo 36 dynamics.

Although these subsystems are treated separately for design control, they are interconnected separately and coupled through states. For the second subsystem a back-stepping control approach is used to find out the appropriate height $h(x_{ls})$. Starting with (16)

$$\dot{x}_4 = x_5 = \theta_5(t) \tag{37}$$

where $\theta_5$ is the new virtual control law for the second subsystem (16). Therefore the error variable is defined as $z_5=x_5-\theta_5(t)$ and similarly a Lyapunov function candidate is defined as $$V_3 = \frac{1}{2}z_5^2 \tag{38}$$

Differentiating (38) one has $$\dot{V}_3 = z_5 \dot{z}_5 = z_5(\dot{x}_5 - \dot{\vartheta}_5(t)) = \qquad (39)$$
$$z_5 \left[ \frac{1}{I_a} \{-C_a x_5 - K_a x_4 + T_{mswash} + l_{bs} A_{bs} x_3 + l_{bs}^2 K_{bs} \tan(x_4)\} - \frac{l_{sv} A_{sv}}{I_a} x_6 - \dot{\vartheta}_5(t) \right]$$

Even though the swash moments are nonlinear in nature, this example used is test branch data for accuracy. Similarly, pump leakage flow $Q_{leak}$ is also computed as tubular data. In (37) and (39), $\theta_5$ and $\dot{\theta}_5$ is defined as desired angular velocity and acceleration for the swash plate respectively. Therefore one can choose any desired and guided swash trajectory for the control law derived in (51).

If one defines $\theta_6$ as $$\vartheta_6 = \left(\frac{l_{sv} A_{sv}}{I_a}\right)^{-1} \left\{ z_5 - \dot{\vartheta}_5(t) + \frac{1}{I_a}(-C_a x_5 - K_a x_4 + T_{mswash} + l_{bs} A_{bs} x_3 + l_{bs}^2 K_{bs} \tan(x_4)) \right\} \qquad (40)$$

and if $x_6 = \theta_6$ then one can easily find out that $$\dot{V}_3 = -\gamma_6 z_5^2 \leq 0, \gamma_6 > 0 \qquad (41)$$

This does not guarantee $x_6 = \theta_6$ at this point and therefore another error variable is used $z_6 = x_6 - \theta_6(t)$ and substituting $x_6 = z_6 + \theta_6$ in (39) one gets $$\dot{V}_3 = z_5 \left[ \frac{1}{I_a} \{-C_a x_5 - K_a x_4 + T_{mswash} + l_{bs} A_{bs} x_3 + l_{bs}^2 K_{bs} \tan(x_4)\} - \frac{l_{sv} A_{sv}}{I_a}(z_6 + \vartheta_6) - \dot{\vartheta}_5(t) \right] \qquad (42)$$

$$\dot{V}_3 = -\gamma_6 z_5^2 - \frac{l_{sv} A_{sv}}{I_a} z_5 z_6 \qquad (43)$$

Equation (43) is not negative semi-definite as the sign of the term $z_5 z_6$ is unknown. One then proceeds with the next step of backstepping until a proposed input variable shows up in the Lyapunov proof. To continue differentiating the variable $z_6$ $$\dot{z}_6 = \dot{x}_6 - \dot{\vartheta}_6(t) = \qquad (44)$$
$$\frac{\beta}{V_{sv}} \left\{ C_d x_7 h \sqrt{\frac{2}{\rho}(x_3 - x_6)} - C_d \left(\frac{L_{lsA}}{2} - x_7\right) h \sqrt{\frac{2}{\rho}(x_6 - P_t)} \right\} - \dot{\vartheta}_6(t)$$

$$\dot{z}_6 = \frac{\beta}{V_{sv}} \left\{ C_d x_7 h \sqrt{\frac{2}{\rho}(x_3 - x_6)} - C_d \left(\frac{L_{lsA}}{2} - x_7\right) h \sqrt{\frac{2}{\rho}(x_6 - P_t)} \right\} - \qquad (45)$$
$$\left(\frac{l_{sv} A_{sv}}{I_a}\right)^{-1} \frac{d}{dt} \left\{ z_5 - \dot{\vartheta}_5(t) + \frac{1}{I_a}(-C_z x_5 - K_a x_4 + T_{mswash} + l_{bs} A_{bs} x_3 + l_{bs}^2 K_{bs} \tan(x_4)) \right\}$$

Rewriting (45) one has $$\dot{z}_6 = \frac{\beta}{V_{sv}} \left\{ C_d x_7 h \sqrt{\frac{2}{\rho}(x_3 - x_6)} - C_d \left(\frac{L_{lsA}}{2} - x_7\right) h \sqrt{\frac{2}{\rho}(x_6 - P_t)} \right\} - \qquad (46)$$

-continued
$$\left(\frac{l_{sv} A_{sv}}{I_a}\right)^{-1} \left\{ \dot{z}_5 - \ddot{\vartheta}_5(t) + \frac{1}{I_a}(-C_a \dot{x}_5 - K_a \dot{x}_4 + \dot{T}_{mswash} + l_{bs} A_{bs} \dot{x}_3 + l_{bs}^2 K_{bs} \sec^2(x_4)) \right\}$$

Note that Load Sense spool displacement $x_{ls}$ or $x_7$ is one of the dominant factors in (46). But one can always choose to discretize the servo flow based on $x_7$ as $$Q_{stsv} = C_d x_7 h \sqrt{\frac{2}{\rho}(x_3 - x_6)} \ \forall \ x_7 > 0 \qquad (47)$$

$$Q_{stsv} = C_d \left(\frac{L_{lsA}}{2} - x_7\right) h \sqrt{\frac{2}{\rho}(x_6 - P_t)} \ \forall \ x_7 \leq 0$$

Considering another Lyapunov function as $$V_4 = V_3 + \tfrac{1}{2} z_6^2 \qquad (48)$$

and differentiating (48) with respect to time one has $$\dot{V}_4 = \dot{V}_3 + z_6 \dot{z}_6 = -\gamma_6 z_5^2 - \frac{l_{sv} A_{sv}}{I_a} z_5 z_6 + z_6 \dot{z}_6 \text{ or} \qquad (49)$$

$$\dot{V}_4 = -\gamma_6 z_5^2 - \frac{l_{sv} A_{sv}}{I_a} z_5 z_6 + \qquad (50)$$
$$z_6 \left[ \frac{\beta}{V_{sv}} \left\{ C_d x_7 \sqrt{\frac{2}{\rho}(x_3 - x_6)} - C_d \left(\frac{L_{lsA}}{2} - x_7\right) \sqrt{\frac{2}{\rho}(x_6 - P_t)} \right\} h - \right.$$
$$\left. \left(\frac{l_{sv} A_{sv}}{I_a}\right)^{-1} \left\{ \dot{z}_5 - \ddot{\vartheta}_5(t) + \frac{1}{I_a} \right.\right.$$
$$\left.\left. (-C_a \dot{x}_5 - K_a \dot{x}_4 + \dot{T}_{mswash} + l_{bs} A_{bs} \dot{x}_3 + l_{bs}^2 K_{bs} \sec^2(x_4)) \right\} \right]$$

The second proposed input h shows up in (50). Therefore one has a chance to define h such that $\dot{V}_4 \leq 0$ and one way to achieve this is as follows $$h = \left[ \frac{\beta}{V_{sv}} \left\{ C_d x_7 \sqrt{\frac{2}{\rho}(x_3 - x_6)} - C_d \left(\frac{L_{lsA}}{2} - x_7\right) \sqrt{\frac{2}{\rho}(x_6 - P_t)} \right\} \right]^{-1} \qquad (51)$$
$$\left[ \frac{l_{sv} A_{sv}}{I_a} z_5 - \gamma_7 z_6 + \left(\frac{l_{sv} A_{sv}}{I_a}\right)^{-1} \left\{ \dot{z}_5 - \ddot{\vartheta}_5(t) + \frac{1}{I_a}(-C_a \dot{x}_5 - K_a \dot{x}_4 + \dot{T}_{mswash} + l_{bs} A_{bs} \dot{x}_3 + l_{bs}^2 K_{bs} \sec^2(x_4)) \right\} \right]$$

Also using (51) in (50) one has $$\dot{V}_4 = -\gamma_6 z_5^2 - \gamma_7 z_6^2 \qquad (52)$$

Therefore if h defined in (51) can be realized practically then the second subsystem is also stable when swash plate angular velocity and acceleration is guided.

The third subsystem includes Pressure Control and spool dynamics. While passive, the Load Sense spool displacement determines the servo flow which controls the pump's swashplate subsystem.

To begin one considers the Load Sense spool dynamics from (19)-(20) and one can rewrite it as $$\begin{cases} \dot{x}_7 = x_8 \\ \dot{x}_8 = \dfrac{1}{m_{ls}}\{-C_{ls}x_8 - K_{ls}x_7 + u_1\} \end{cases} \quad (53)$$

where $u_1 = A_{ls}(x_3 - x_9 - P_{k_{ls}})$ From [13], the following theorems are applicable for passive systems.

Theorem 1: The feedback connection of two passive systems is passive.

Theorem 2: Consider a feedback connection of two dynamical systems. When input=0, the origin of the closed-loop system is asymptotically stable if each feedback component is either strictly passive, or output strictly passive and zero-state observable. Furthermore, if the storage function for each component is radially unbounded, the origin is globally asymptotically stable.

Theorem 3: consider a feedback connection of a strictly passive dynamical system with a passive memory-less function. When input=0, the origin of the closed-loop system is uniformly asymptotically stable. If the storage function for the dynamical system is radially unbounded, the origin will be globally uniformly asymptotically stable.

In view of the Theorems 1-3, one considers a Lyapunov function as $$V_x = \tfrac{1}{2}(K_{ls}x_7^2 + x_8^2) \quad (54)$$

From this it is easy to prove that while $V_x$ is radially unbounded, the origin globally asymptotically stable if $u_1 = 0$.

Next consider Pressure Control spool dynamics which is also very similar to Load Sense spool dynamics. Rewriting (2) one has $$\begin{cases} \dot{x}_1 = x_2 \\ \dot{x}_2 = \dfrac{1}{m_{pc}}\{-C_{pc}x_2 - K_{pc}x_1\} + u_2 \end{cases} \quad (55)$$

with $$u_2 = \left(\dfrac{A_{pc}}{m_{pc}}x_3 - \dfrac{A_{pc}}{m_{pc}}P_{k_{pc}}\right).$$

Defining a similar Lyapunov function as $$V_y = \tfrac{1}{2}(K_{pc}x_1^2 + x_2^2) \quad (56)$$

one can prove that the third subsystem is as a whole passive. For bounded $u_1$ and $u_2$ one can also easily show that $x_1$, $x_2$, $x_7$ and $x_8$ are all bounded. To prove the boundedness of $u_1$ and $u_2$ as well as for the whole system let us consider a Lyapunov function $V_5$ as $$V_5 = V_4 + V_2 \quad (57)$$

Now differentiating $V_5$ from (57) we have $$\dot{V}_5 \leq -\gamma_7 z_5^2 - \gamma_7 z_6^2 - \gamma_{11} z_{11}^2 - A_{ld}\gamma_{39}z_{39}^2 \quad (58)$$

if Equations (36) and (51) hold. Therefore the whole load sense system is bounded and Lyapunov stable.

A simulation was carried out to verify the proposed results. The simulation was written as a Matlab script file to solve the stiff differential equations given by Equation (1) to (25). Therefore without any loss of generality, a simple example was considered which is less difficult and complex to implement as a script file.

In the simulation example, the stability of the pump pressure and other vital pump parameters under high frequency load oscillations is shown, and there is an assumption that the load is moving away from the bottom of the cylinder, assumed as $x_{ld}=0$.

Figure 4:
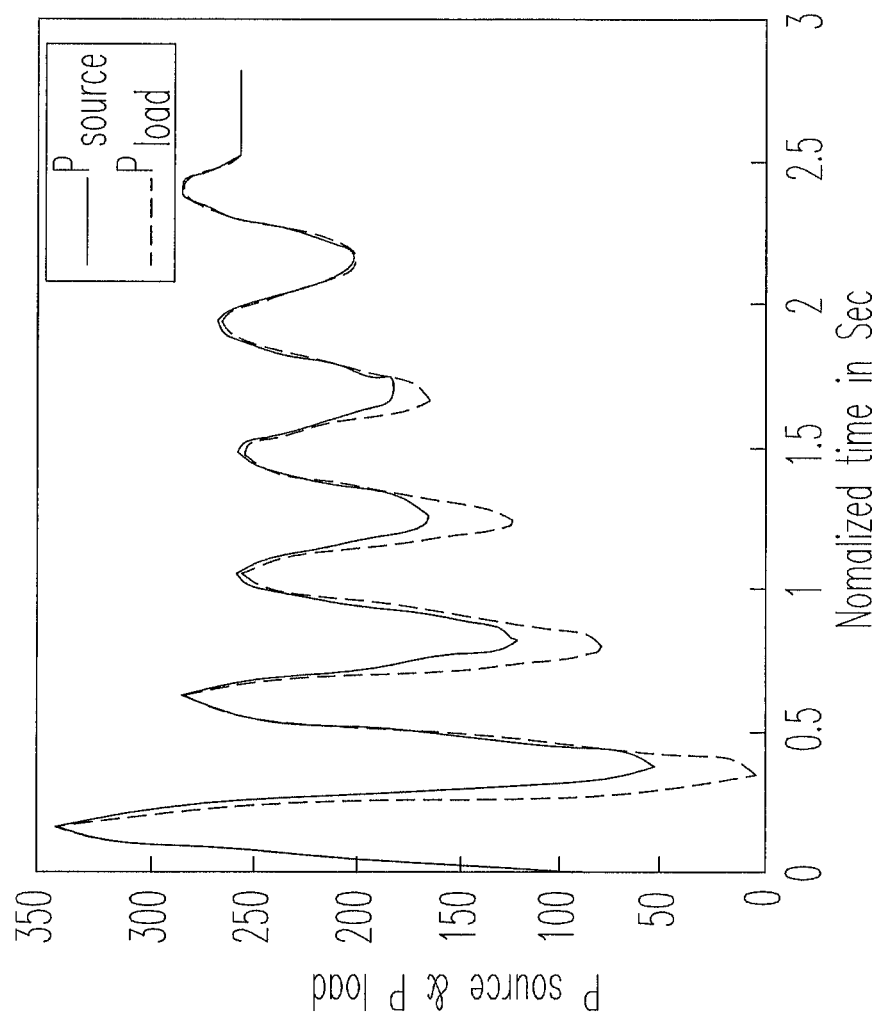
FIG. 4 is a graph comparing pump source and load pressure.
Figure 5:
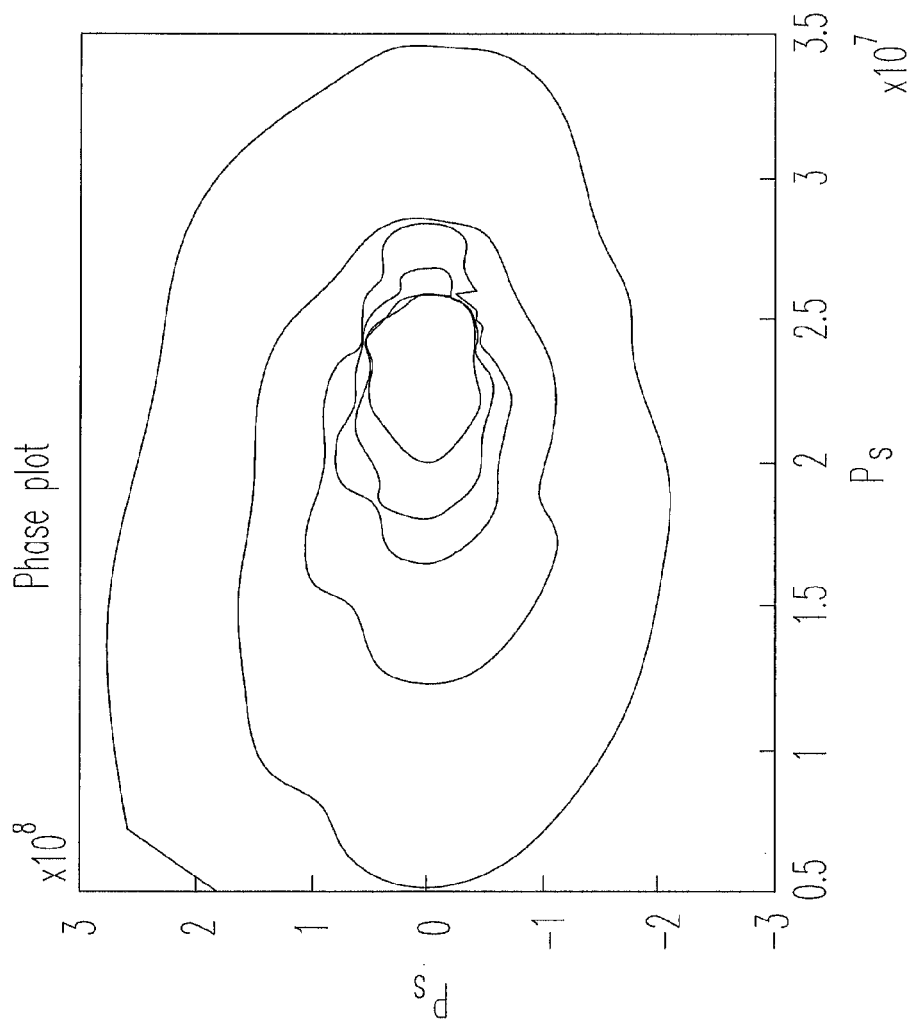
FIG. 5 is a graph of a phase plot of pump protection.
Figure 6:
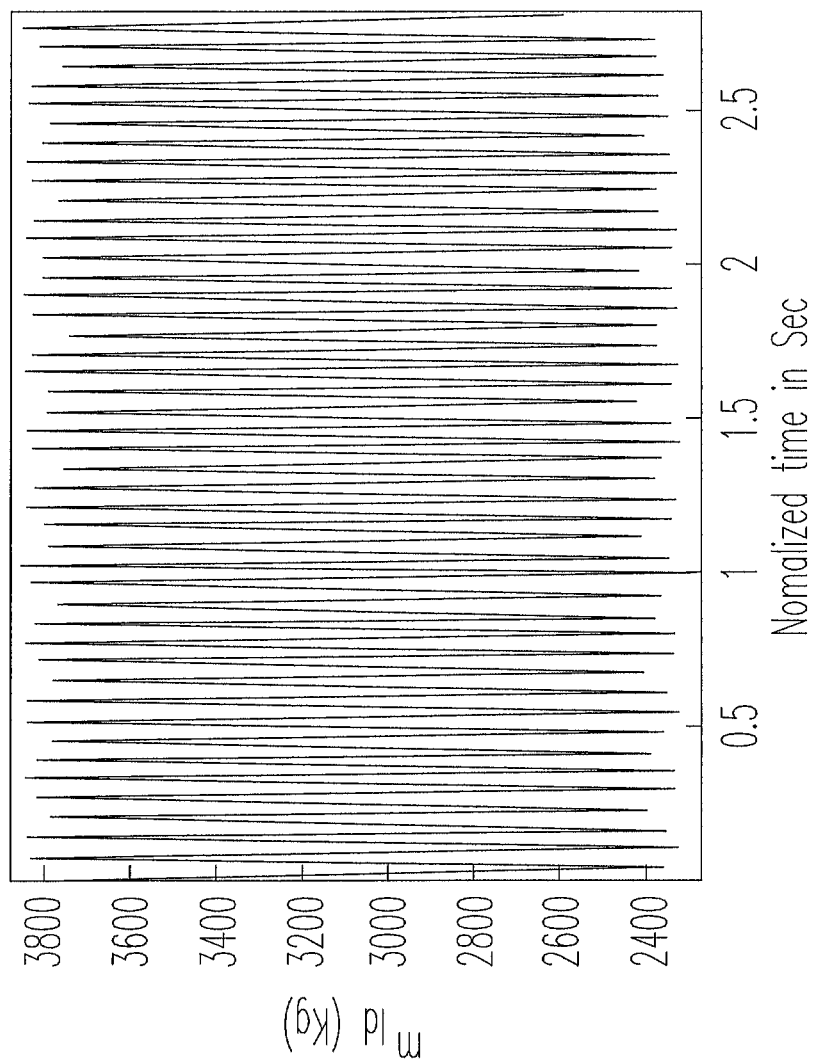
FIG. 6 is a graph of system pressure under load oscillation.

FIG. 4 and FIG. 5 show the pump and load pressure characteristics as well as phase plane plot of the source pressure respectively. It can be seen from the phase plane plot that the system pressure is Lyapunov stable under oscillating load conditions given in FIG. 6.

Figure 7:
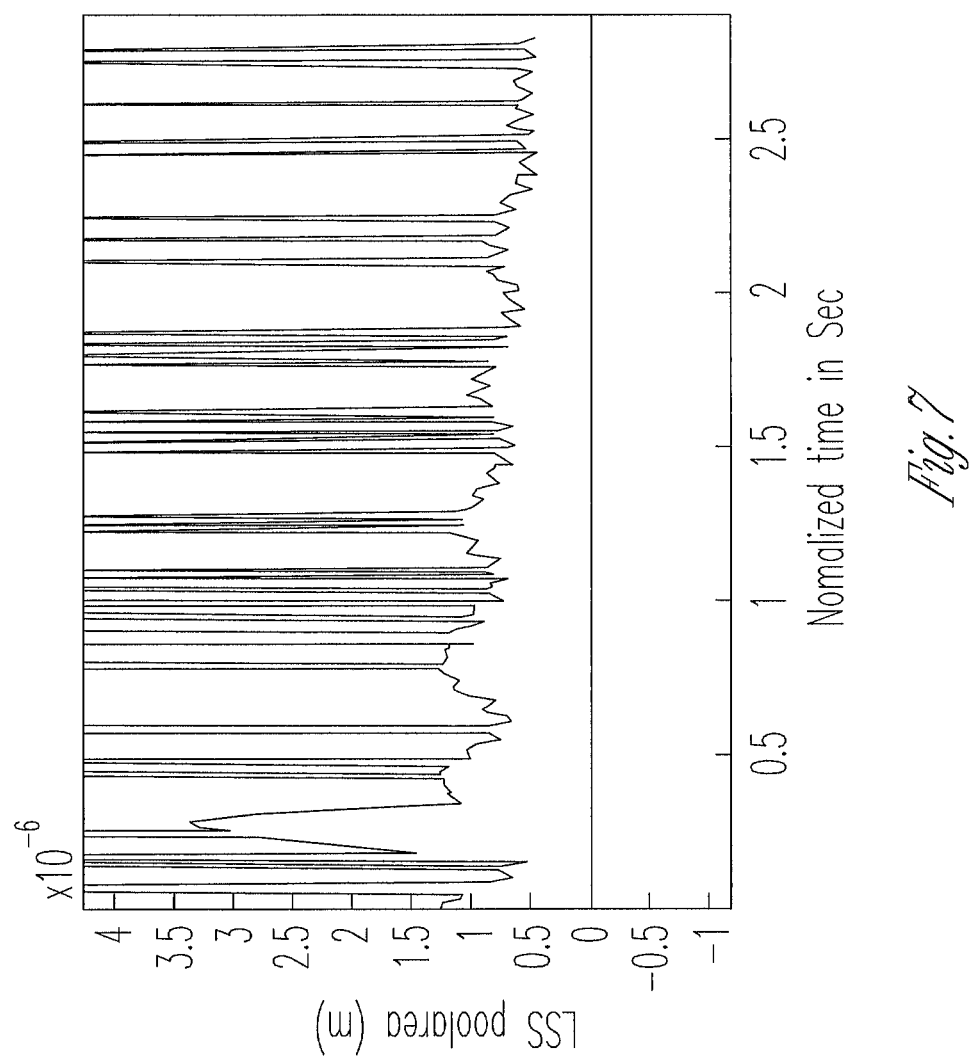
FIG. 7 is a graph showing calculated Load Sense spool area.
Figure 8:
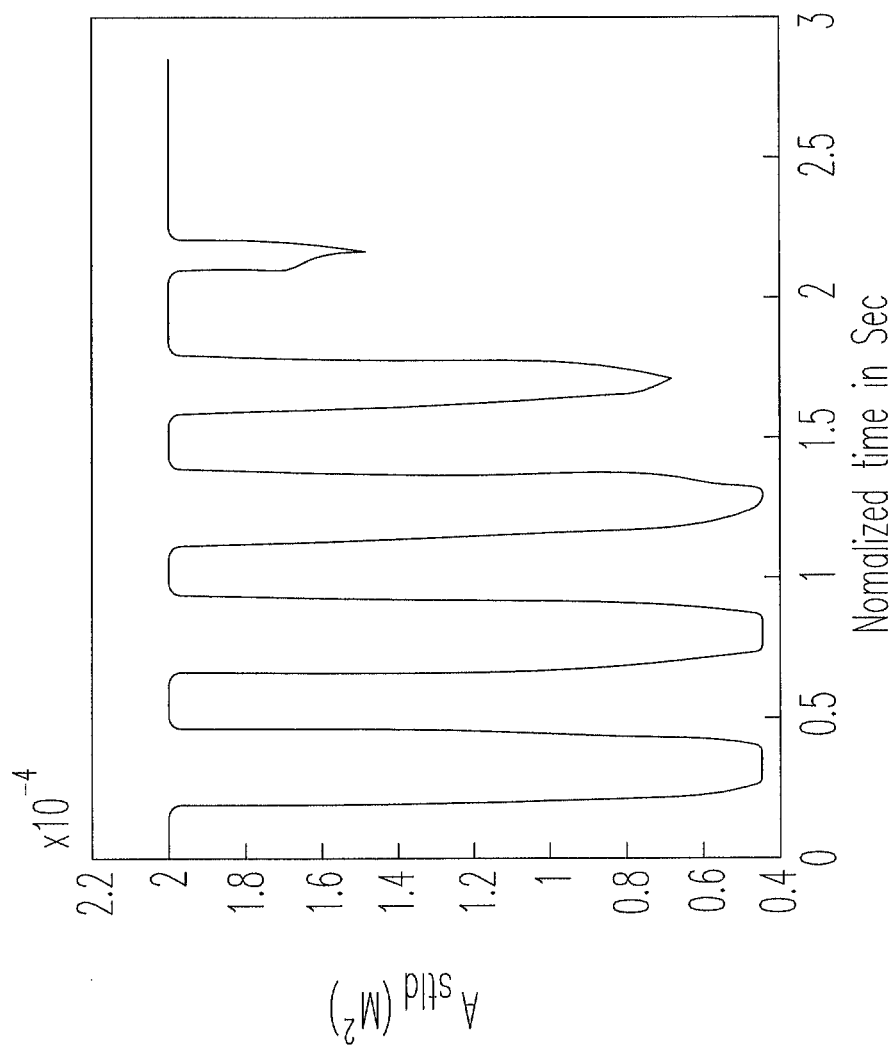
FIG. 8 is a graph showing operator command/valve orifice area.
Figure 9:
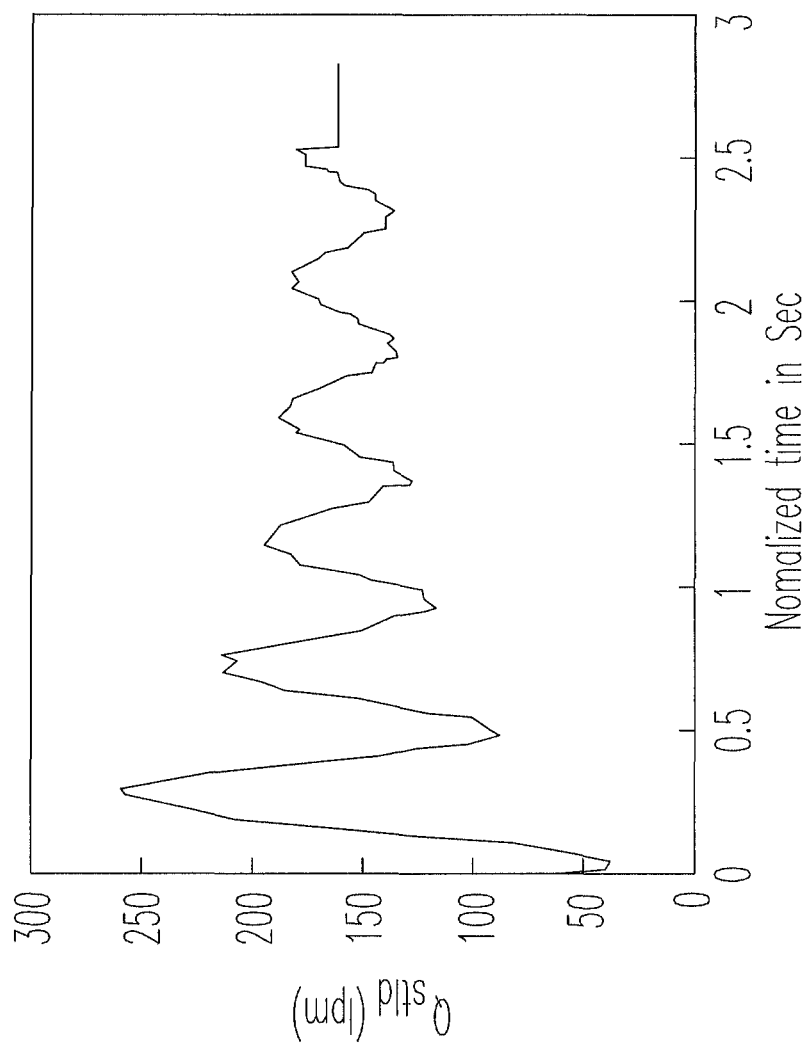
FIG. 9 is a graph showing load flow from source.
Figure 10:
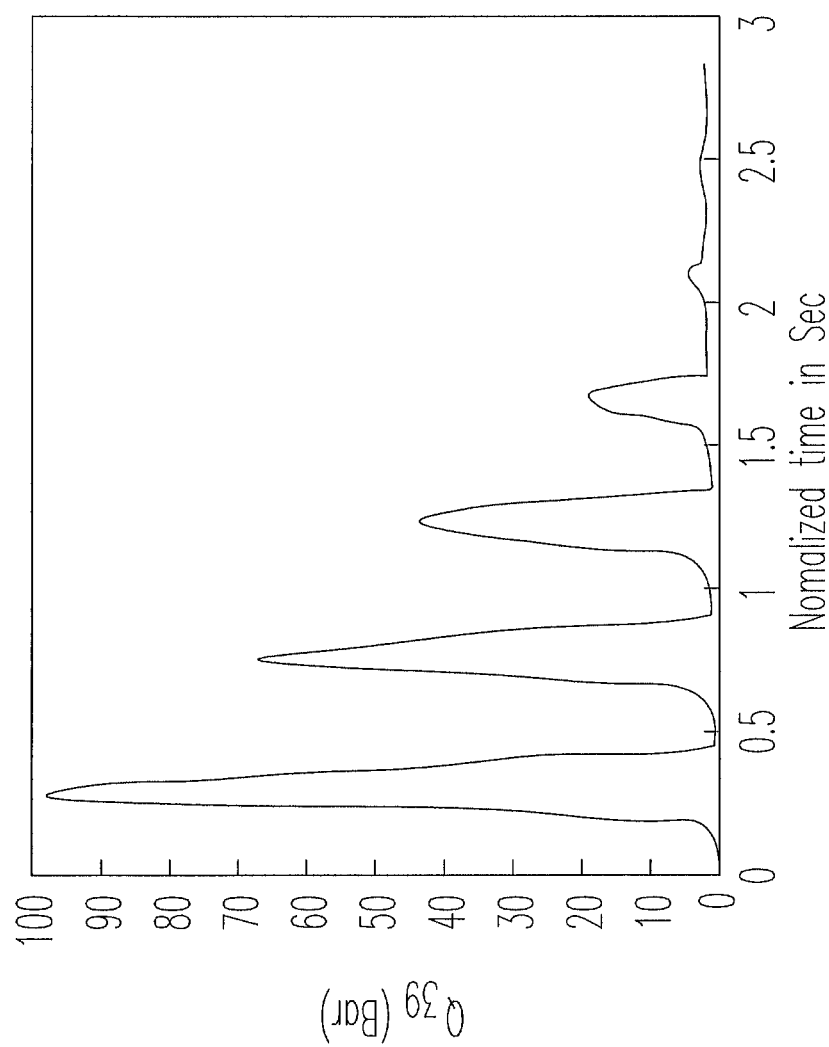
FIG. 10 is a graph showing variable margin pressure.

FIG. 7 and FIG. 8 show the calculated Load Sense spool area and operator command as valve orifice area respectively. It can be noted that, to maintain practicality of the obtained result, saturations were used for the inputs and thereby observed whether Lyapunov stability could be achieved under given restrictions. FIG. 9 and FIG. 10 demonstrate the flow and variable margin pressure of the system.

Figure 11:
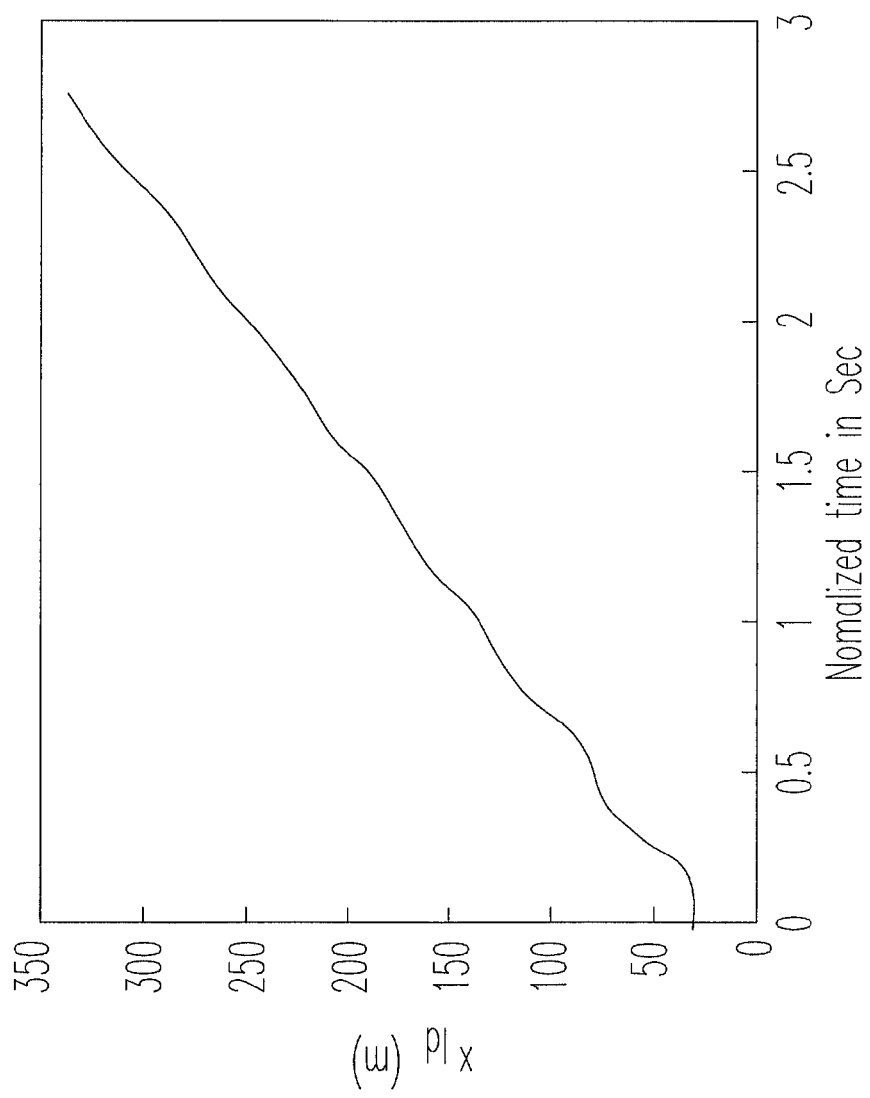
FIG. 11 is a graph showing cylinder position.

FIG. 11 describes the cylinder position under oscillating load conditions.

Accordingly, stability analysis for a load sense pump is considered. Backstepping methodology has implemented on a nonlinear pump model to observe pump stability under oscillating load conditions while computing valve orifice area and Load Sense spool area as external input. While the former one is a real external input, but the later isn't. Desired is to find out a spool area profile to adjust gain and choke orifice size under oscillating load situation.

What is claimed is:

1. A method of stabilizing a hydraulic load sense system, comprising the steps of:
    defining a first subsystem related to operator command, a second subsystem related to a load sense spool effective opening area, and a third subsystem related to load sense spool displacement;
    applying with a computer a first backstepping control to determine a first control input to stabilize the first subsystem;
    applying with a computer a second backstepping control to determine a second control input to stabilize the second subsystem;
    calculating a feasible load sense area based upon the first and second control inputs and the third subsystem; and
    controlling a hydraulic pump based upon the feasible load sense area.

2. The method of claim 1 wherein the first backstepping control includes using a first and a second error variable.

3. The method of claim 1 wherein the first subsystem includes cylinder acceleration, system pressure, servo pressure, and load dynamics.

4. The method of claim 1 further comprising the step of determining a margin pressure setting.

5. The method of claim 1 wherein the first subsystem includes states $\dot{x}_9$, $\dot{x}_{10}$, and $\dot{x}_{11}$; wherein $\dot{x}_9$, is defined as $$\dot{x}_9 = \dfrac{\beta}{V_{ld}}\left\{C_d A_{stld}\sqrt{\dfrac{2}{\rho}(x_3 - x_9)} - A_{ld}x_{11}\right\},$$

$\dot{x}_{10}$ is defined as $\dot{x}_{10} = x_{11}$, and $\dot{x}_{11}$ is defined as $\dot{x}_{11} = -C_{ld}x_{11} - K_{ld}x_{10} - A_{ld}x_9 + 0.7A_{ld}P_t + m_{ld}g$.

6. The method of claim 1 wherein the second subsystem includes states $\dot{x}_3$, $\dot{x}_4$, and $\dot{x}_5$; wherein $\dot{x}_3$ is defined as $$\dot{x}_3 = \frac{\beta}{V_{Ps}}\left(-C_d A_{stld}\sqrt{\frac{2}{\rho}(x_3-x_9)}-Q_{leak}\right)+\frac{\beta}{V_{Ps}}\frac{n_p A_p l_p}{\pi}\omega\tan(x_4),$$

$\dot{x}_4$ is defined as $\dot{x}_4 = x_5$, and $\dot{x}_5$ is defined as $$\dot{x}_5 = \frac{1}{I_a}\{-C_a x_5 - K_a x_4 + T_{mswash} + l_{bs}A_{bs}x_3 + l_{bs}^2 K_{bs}\tan(x_4)\} - \frac{l_{sv}A_{sv}}{I_a}x_6.$$

7. The method of claim 1 wherein the third subsystem includes states $\dot{x}_1$, $\dot{x}_2$, $\dot{x}_7$, and $\dot{x}_{38}$; wherein $\dot{x}_1$ is defined as $\dot{x}_1 = x_2$, $\dot{x}_2$ is defined as $$\dot{x}_2 = \frac{1}{m_{pc}}\{-C_{pc}x_2 - K_{pc}x_1 - A_{pc}P_{k_{pc}}\} + \frac{A_{pc}}{m_{pc}}x_3,$$

$\dot{x}_7$ is defined as $\dot{x}_7 = x_8$, and $\dot{x}_8$ is defined as $$\dot{x}_8 = \frac{1}{m_{ls}}\{-C_{ls}x_8 - K_{ls}x_7 + A_{ls}(x_3 - x_9 - P_{k_{ls}})\}.$$

8. The method of claim 1 wherein the third subsystem is passive.

* * * * *